United States Patent
Kannan (10) Patent No.: US 11,436,618 B2
(45) Date of Patent: Sep. 6, 2022

(54) METHOD AND APPARATUS FOR PROVIDING CUSTOMER NOTIFICATIONS

(71) Applicant: [24]7.ai, Inc., Campbell, CA (US)

(72) Inventor: Pallipuram V. Kannan, Saratoga, CA (US)

(73) Assignee: [24]7.ai, Inc., Campbell, CA (US)

( * ) Notice: Subject to any disclaimer, the term of this patent is extended or adjusted under 35 U.S.C. 154(b) by 254 days.

(21) Appl. No.: 14/714,085

(22) Filed: May 15, 2015

(65) Prior Publication Data

US 2015/0339683 A1 Nov. 26, 2015

Related U.S. Application Data

(60) Provisional application No. 62/000,992, filed on May 20, 2014.

(51) Int. Cl.
*G06Q 30/00* (2012.01)
*G06Q 30/02* (2012.01)
(Continued)

(52) U.S. Cl.
CPC ....... *G06Q 30/0202* (2013.01); *G06Q 30/016* (2013.01); *H04L 67/22* (2013.01);
(Continued)

(58) Field of Classification Search
CPC ............. G06Q 30/0202; G06Q 30/016; G06Q 30/0251; G06F 17/2795; G06F 17/30401;
(Continued)

(56) References Cited

U.S. PATENT DOCUMENTS 6,349,290 B1  2/2002  Horowitz et al.
6,886,037 B1 *  4/2005  Brewer .................. G06Q 30/02
                                                709/217
(Continued)

FOREIGN PATENT DOCUMENTS

CA      2813321 A1      4/2012
CN   110599324 A  *  12/2019
(Continued)

OTHER PUBLICATIONS

A. Acharya, J. Manweiler, S. Sharma and N. Banerjee, "Presence based open contact center leveraging social networks," 2013 IFIP/IEEE International Symposium on Integrated Network Management (IM 2013), 2013, pp. 990-1003. (Year: 2013).*

*Primary Examiner* — Rutao Wu
*Assistant Examiner* — Tyrone E Singletary
(74) *Attorney, Agent, or Firm* — Perkins Coie LLP; Michael Glenn; Vikram Iyengar (57) ABSTRACT

A computer-implemented method and an apparatus for providing customer notification detects the presence of a customer in one or more interaction channels from among a plurality of interaction channels. The presence of the customer in the one or more interaction channels is stored as presence information. Attention information corresponding to the customer is determined in connection with the presence information. The attention information indicates a current attention of the customer. A notification is provided to the customer on an interaction channel from among the plurality of interaction channels over which the customer is identified to be active or most likely to be active, based on the presence information and the attention information.

25 Claims, 6 Drawing Sheets

(51) Int. Cl.
  *H04M 3/523* (2006.01)
  *H04L 67/50* (2022.01)
  *H04M 3/51* (2006.01)
(52) U.S. Cl.
  CPC ....... *H04M 3/5141* (2013.01); *H04M 3/5183* (2013.01); *H04M 3/5231* (2013.01); *H04M 3/5232* (2013.01)
(58) Field of Classification Search
  CPC ... H04L 67/22; H04M 3/5141; H04M 3/5183; H04M 3/5231; H04M 3/5232
  USPC ....................................................... 705/7.31
  See application file for complete search history.

(56) References Cited

U.S. PATENT DOCUMENTS

| | | | |
|---|---|---|---|
| 7,573,996 B1 * | 8/2009 | Somani | H04M 3/5231 379/142.06 |
| 8,976,955 B2 * | 3/2015 | Liberman Ben-Ami | H04M 3/5191 379/265.09 |
| 9,092,801 B2 | 7/2015 | Chang | |
| 9,137,372 B2 * | 9/2015 | Conway | H04M 3/5233 |
| 9,742,912 B2 * | 8/2017 | Srivastava | G06F 40/10 |
| 10,417,643 B2 | 9/2019 | Sri et al. | |
| 2002/0116336 A1 * | 8/2002 | Diacakis | G06Q 10/087 705/51 |
| 2003/0023691 A1 * | 1/2003 | Knauerhase | H04L 51/04 709/206 |
| 2003/0115113 A1 | 6/2003 | Duncan et al. | |
| 2004/0010431 A1 * | 1/2004 | Thomas | G06Q 10/06311 705/7.13 |
| 2004/0183749 A1 * | 9/2004 | Vertegaal | G05B 23/02 345/7 |
| 2005/0209868 A1 * | 9/2005 | Wan | G06F 17/2795 705/345 |
| 2006/0150119 A1 * | 7/2006 | Chesnais | G06F 16/243 715/810 |
| 2009/0292927 A1 | 11/2009 | Wenzel et al. | |
| 2011/0047116 A1 * | 2/2011 | Balasaygun | G06Q 30/02 706/47 |
| 2011/0302117 A1 | 12/2011 | Pinckney et al. | |
| 2012/0116869 A1 | 5/2012 | Vasudevan et al. | |
| 2012/0278115 A1 * | 11/2012 | Acharya | G06Q 30/02 705/7.13 |
| 2012/0303442 A1 | 11/2012 | Patwa et al. | |
| 2013/0054366 A1 | 2/2013 | Roundtree et al. | |
| 2013/0080362 A1 * | 3/2013 | Chang | G06Q 30/0202 706/21 |
| 2013/0128440 A1 | 5/2013 | Chen et al. | |
| 2014/0013244 A1 | 1/2014 | Lindsay et al. | |
| 2014/0126713 A1 * | 5/2014 | Ristock | H04M 3/5141 379/265.09 |
| 2015/0254675 A1 | 9/2015 | Kannan et al. | |
| 2017/0278010 A1 * | 9/2017 | Edakunni | G06N 5/02 |

FOREIGN PATENT DOCUMENTS

| | | | | |
|---|---|---|---|---|
| WO | WO-2009089532 A1 * | 7/2009 | ......... | A61B 5/0484 |
| WO | 20130128440 A1 | 9/2013 | | |

* cited by examiner

METHOD AND APPARATUS FOR PROVIDING CUSTOMER NOTIFICATIONS

CROSS REFERENCE TO RELATED APPLICATIONS

This application claims priority to U.S. provisional patent application Ser. No. 62/000,992, filed May 20, 2014, and U.S. patent application Ser. No. 14/625,381, filed Feb. 18, 2015, each of which application is incorporated herein in its entirety by this reference thereto.

TECHNICAL FIELD

The invention relates to messaging mechanisms. More particularly, the invention relates to a method and apparatus for providing customer notifications.

BACKGROUND

Enterprises may provide notifications to customers for a variety of reasons, such as for example, to draw customer's attention towards a product or a service, to provide information about an event of customer interest, to offer incentives and discounts, to solicit feedback, to provide billing related information, and the like. In conventional mechanisms, the notifications are configured for mass consumption and do not take a customer's individual preferences into account. More specifically, the conventional mechanisms are not configured to be responsive to a customer's preference for a type of content, a presentation of content, a notification medium, a time for receiving notification, and the like.

In an example scenario, a customer may receive notifications regarding weather forecasts, whereas the customer may prefer receiving notifications regarding news and sports related activities.

In another example scenario, the customer may receive a notification for an event of customer interest over email, whereas the customer may prefer receiving such notifications over the phone.

In yet another example scenario, the notifications may be sent to a customer at a time that is inconvenient for a customer to view the received notifications. For example, a notification regarding an offer on a product or a service may be sent to a customer when the customer is driving a vehicle or is engaged in an important professional activity, and the customer may miss out on the notification.

Notifications sent to customers in such a manner may fail to serve their intended purpose. Moreover, the customers may also miss out on important communication, which may negatively influence the customer's mood and even may result in adverse customer reaction towards the enterprise. Accordingly, it would be advantageous to take the customer's preference into account prior to sending notifications to the customers.

SUMMARY

In an embodiment of the invention, a computer-implemented method includes detecting, by a processor, the presence of a customer in one or more interaction channels from among a plurality of interaction channels. The presence of the customer in the one or more interaction channels is stored as presence information. The method determines, by the processor, attention information corresponding to the customer in connection with the presence information. The attention information is indicative of a current attention of the customer. The method provides, by the processor, a notification to the customer on an interaction channel from among the plurality of interaction channels over which the customer is identified to be active or most likely to be active, based on the presence information and the attention information.

In another embodiment of the invention, an apparatus for providing customer notifications includes at least one processor and a memory. The memory stores machine executable instructions therein that, when executed by the at least one processor, cause the apparatus to detect the presence of a customer in one or more interaction channels from among a plurality of interaction channels. The apparatus stores the presence of the customer in the one or more interaction channels as presence information. The apparatus determines attention information corresponding to the customer in connection with the presence information. The attention information is indicative of a current attention of the customer. The apparatus provides a notification to the customer on an interaction channel from among the plurality of interaction channels over which the customer is identified to be active or most likely to be active, based on the presence information and the attention information.

In another embodiment of the invention, a non-transitory computer-readable medium stores a set of instructions that, when executed, cause a computer to perform a method for providing customer notifications. The method executed by the computer detects the presence of a customer in one or more interaction channels from among a plurality of interaction channels. The presence of the customer in the one or more interaction channels is stored as presence information. The method determines attention information corresponding to the customer in connection with the presence information. The attention information is indicative of a current attention of the customer. A notification is provided to the customer on an interaction channel from among the plurality of interaction channels over which the customer is identified to be active or most likely to be active, based on the presence information and the attention information.

DETAILED DESCRIPTION

Figure 1:
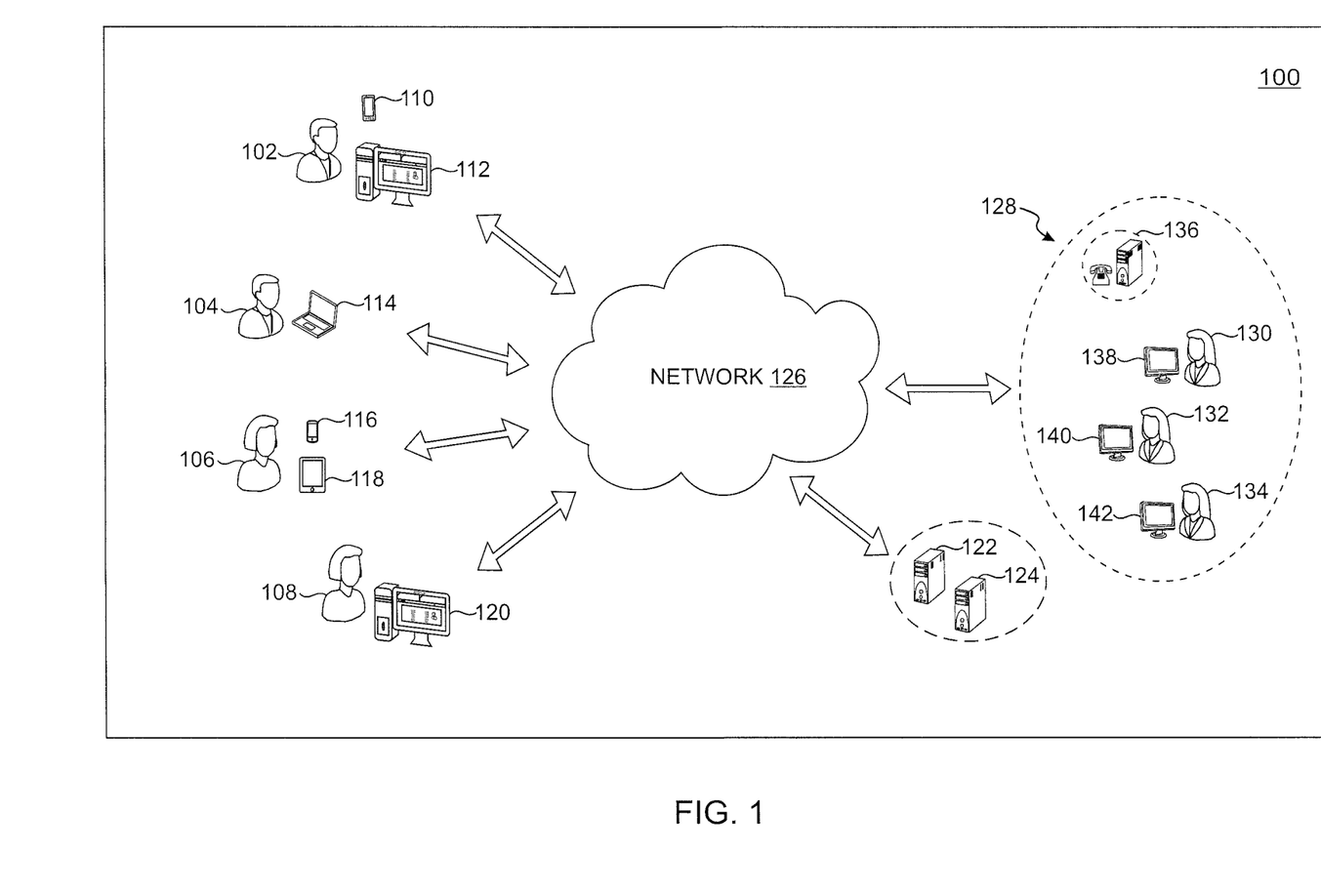
FIG. 1 is a schematic diagram showing an illustrative environment in accordance with an example scenario.

FIG. 1 is a schematic diagram showing an illustrative environment 100 in accordance with an example scenario. The environment 100 depicts a plurality of customers, such as a customer 102, a customer 104, a customer 106 and a customer 108. It is noted that the term 'customers' as used herein includes both existing customers, as well as potential customers of information, products, and services offered by various enterprises. It is understood that the environment 100 is depicted to include four customers for illustration purposes and that the environment 100 may include a plurality of customers, such as the customer 102-108, located at remote geographical locations. Each customer from among the plurality of customers may be associated with one or more electronic devices. For example, customer 102 is associated with electronic devices 110 and 112, the customer 104 is associated with an electronic device 114, the customer 106 is associated with electronic devices 116, and 118 and the customer 108 is associated with an electronic device 120. Examples of the electronic devices 110-120 may include mobile phones, smartphones, laptops, personal computers, tablet computers, personal digital assistants, smart watches, Web-enabled wearable devices, and the like.

Various enterprises may provide periodic notifications to the customers 102-108 for a variety of reasons, such as for example, to draw customer's attention towards a product or a service, to provide information about an event of customer interest, to offer incentives and discounts, to solicit feedback, to provide billing related information, and the like. In some exemplary scenarios, the notifications may be embodied in an electronic form and directed to the electronic devices 110-120 associated with the customers 102-108. Typically, the enterprises may employ Web servers, such as Web servers 122 and 124, which are programmed to send notifications to the electronic devices 110-120 over a network 126. Examples of the network 126 may include wired networks, wireless networks, or a combination thereof. Examples of wired networks may include Ethernet, local area network (LAN), fiber-optic cable network, and the like. Examples of wireless network may include cellular networks like GSM/3G/4G/CDMA networks, wireless LAN, Bluetooth or Zigbee networks, and the like. An example of a combination of wired and wireless networks may include the Internet.

In some exemplary scenarios, the enterprises may also extend dedicated customer sales and support (CSS) facilities to their customers. The CSS facilities include a number of customer service representatives, such as agents, chat bots, self assist systems, such as either Web or mobile digital self-service, and/or interactive voice response (IVR) systems. In addition to interacting with the customers, providing information, selling to them, answering their queries, addressing their concerns, and/or resolving their issues, the customer service representatives may also be entrusted with notifying the customers over various means of communication or notification, such as for example by way of voice interaction, visual interaction, textual interaction medium, and the like. For example, an agent may initiate an outbound voice call to notify a customer that a bill is due.

The environment 100 depicts a CSS facility 128, including a plurality of agents, such as agent 130, agent 132, and agent 134, and one or more self-assist mechanisms, such as an IVR system 136. The CSS facility 128 may also include customer service representatives, such as chat bots and self-assist systems. Moreover, the CSS facility 128 is depicted to include only three agents 130, 132, and 134 and the IVR system 136 for illustration purposes, although the CSS facility 128 may include fewer or more agents/IVR systems.

Each agent in the CSS facility 128 is associated with one or more electronic devices. For example, the agent 130 is associated with electronic device 138, the agent 132 is associated with an electronic device 140, and the agent 134 is associated with electronic device 142. The agents 130-134 may use the respective electronic devices for interacting with customers located at remote geographical locations, such as the customers 102-108. Although the agents 130-134 are depicted to be associated with desktop computers in FIG. 1, the agents 130-134 may also be associated with other electronic devices, such as for example, telephone instruments, mobile phones, laptops, and the like.

The notifications provisioned by the Web servers 122 and 124, as well as the agents 130-134, are typically configured for mass consumption and do not take a customer's individual preferences into account. More specifically, such notifications are not configured to be responsive to a customer's preference for a type of content, a presentation of content, a notification medium, a time for receiving notification, and the like. For example, a customer from among the customers 102-108 may receive notifications regarding weather forecasts, whereas the customer may prefer receiving notifications regarding news and sports related activities. In another example, the customer may receive a notification for an event of customer interest over email, whereas the customer may prefer receiving such notifications over the phone. In some exemplary scenarios, the notifications may be sent to a customer at a time inconvenient for a customer to view the received notifications. For example, an outbound voice call regarding an offer on a product or a service may be initiated to a customer when the customer is driving a vehicle or is engaged in an important professional activity, and the customer may miss out on the notification. Notifications sent to the customers in such a manner may fail to serve their intended purpose. Moreover, the customers may also miss out on important communication, which may negatively influence the customer's mood and even may result in adverse customer reaction towards the enterprise. Various embodiments of the invention overcome these and other obstacles and provide additional benefits. More specifically, embodiments of the invention provide notifications to customers in a medium where the customer is active or most likely to be active. Moreover, the notification is provided in a manner preferred by the customer and most suited to the content of the notification. A customer notification system is explained with reference to FIG. 2.

Figure 2:
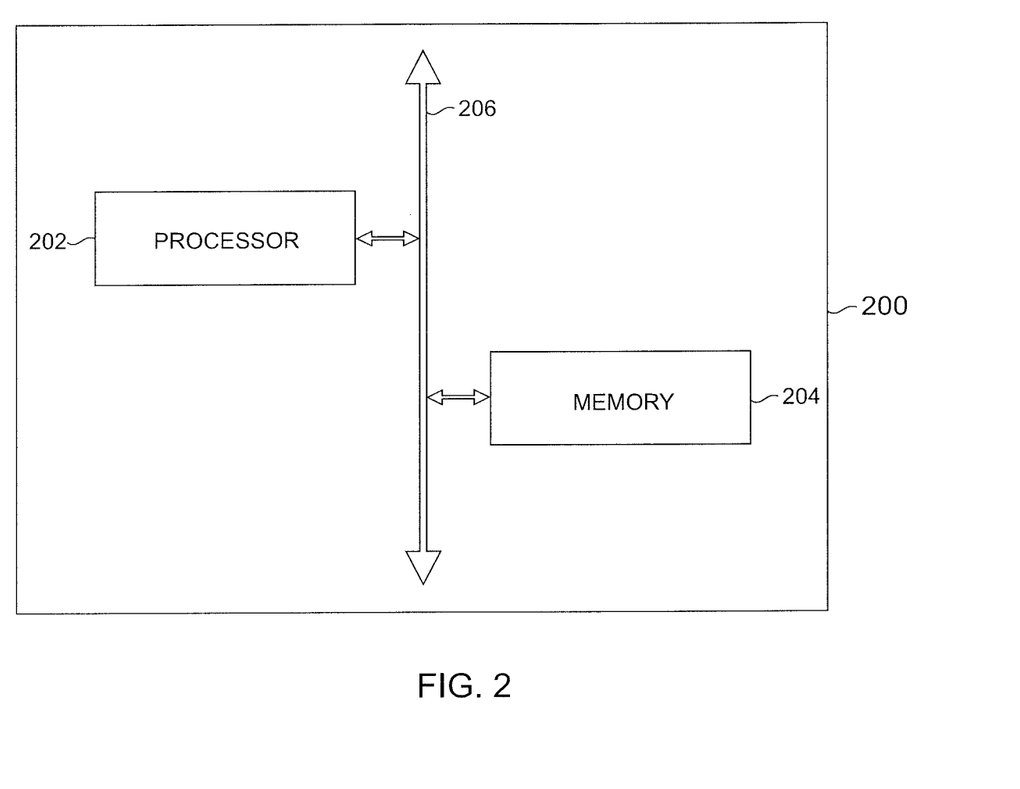
FIG. 2 is a block diagram of an example apparatus for providing customer notifications in accordance with an embodiment of the invention.

FIG. 2 is a block diagram of an example apparatus 200 for providing customer notifications in accordance with an embodiment. In an embodiment, the apparatus 200 may be embodied as a Web server, such as the Web servers 122 and 124 depicted in FIG. 1, configured to be communicatively associated with various customer service representatives at a CSS facility, such as the CSS facility 128, and the plurality of customers, such as the customers 102-108 depicted in FIG. 1. Pursuant to an exemplary scenario, the apparatus 200 may be any machine capable of executing a set of instructions, sequential and/or otherwise, so as to improve customer interaction experiences.

The apparatus 200 includes at least one processor, such as a processor 202, and a memory 204. Although the apparatus 200 is depicted to include only one processor, the apparatus 200 may include more than one processor. In an embodiment, the processor 202 and the memory 204 are configured to communicate with each other via or through a bus 206. Examples of the bus 206 may include, but are not limited to, a data bus, an address bus, a control bus, and the like. The bus 206 may be, for example, a serial bus, a bi-directional bus, or a unidirectional bus. In an embodiment, the bus 206 may be embodied as a centralized circuit system.

In an embodiment, the memory 204 stores machine executable instructions. Further, the processor 202 executes the stored machine executable instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed. The processor 202 may include, among other things, a clock, an arithmetic logic unit (ALU), and logic gates configured to support an operation of the processor 202. The memory 204 may be embodied as one or more volatile memory devices, one or more non-volatile memory devices, and/or a combination of one or more volatile memory devices and non-volatile memory devices. For example, the memory 204 may be embodied as magnetic storage devices, such as hard disk drives, floppy disks, magnetic tapes, etc., optical magnetic storage devices, e.g. magneto-optical disks, CD-ROM (compact disc read only memory), CD-R (compact disc recordable), CD-R/W (compact disc rewritable), DVD (Digital Versatile Disc), BD (Blu-ray® Disc), and semiconductor memories, such as mask ROM, PROM (programmable ROM), EPROM (erasable PROM), flash ROM, RAM (random access memory), etc.

As explained with reference to FIG. 1, customers may interact with an enterprise over multiple interaction channels. The information related to customer activity on the interaction channels may be collated and stored in the memory 204 as interaction data. For example, the customer may access a Website corresponding to an enterprise for locating content of interest. Accordingly, information related to customer activity on the Website, such as sequence of Web pages visited, menus accessed on one or more Web pages, time spent on the Web pages, and such other information related to the customer's Web journey may be stored as interaction data. In another illustrative example, when the customer has contacted a customer service center associated with the enterprise and interacted with an IVR system, the customer's intention (referred to as 'intent' hereinafter) for contacting the IVR system, the IVR options selected by the customer, whether the customer's concern was resolved or not, and such other information related to customer activity on the IVR channel may be stored as interaction data. It is understood that interaction data may further include data collated from customer activity on other interaction channels, such as speech channel, chat channel, social media channel, native mobile application channel, enterprise branch channel, for example a customer's visit to a physical store, and the like.

In addition to the interaction data, the memory 204 stores profile information corresponding to the customer. The stored profile information may include the customer's name, contact details, personal and family information, financial information, information relating to products and services associated with the customer, social media account information, other related messaging or sharing platforms, and the like. The customer information may further include information related to customer interests and preferences. In some exemplary embodiments, the customer information may also include calendar information associated with the customer. For example, the calendar information may include information related to availability of the customer during the duration of the day/week/month and the like.

In an embodiment, the processor 202 is configured to, with the content of the memory 204, cause the apparatus 200 to detect a presence of a customer in one or more interaction channels from among a plurality of interaction channels. The determination of the presence of the customer in one or more interaction channels may be performed as explained below.

In an embodiment, the apparatus 200 may be configured to probe a presence of the customer actively in any of the interaction channels. For example, the apparatus 200 may track invoking of native mobile applications in electronic devices by the customer that corresponds to a chosen product and/or service. Upon identifying an instance of invoking of a native mobile application in an electronic device associated with a customer, the apparatus 200 may determine the presence of the customer in the native channel. In another illustrative example, if the apparatus 200 identifies an instance of a customer browsing a Website corresponding to the selected product and/or service, the apparatus 200 may determine the presence of the customer in the Web channel. In yet another illustrative example, the customer may have logged in to one or more social networking media accounts or public interaction and/or sharing accounts, such as for example, in any of Facebook®, Twitter™, LinkedIn™, and the like. The apparatus 200 may accordingly record the presence of the customer in social channel. In still another illustrative example, the customer may be chatting on a chat application. The apparatus 200 may detect the presence of the customer in the messaging channel and record the presence accordingly.

In an embodiment, one or more tracking cookies may be included in a device browser associated with the customer device, which may enable the apparatus 200 to identify the presence of the customer in an interaction channel. The determining presence of the customer in an interaction channel may be performed by the apparatus 200 based on stored data corresponding to the customer. As explained above, the profile information may include personal details, such as name, mailing address, contact information, such as mobile phone number, login id, IP address, and the like. Accordingly, an instance of invoking a native mobile application in a mobile phone may result in determination of the customer associated with the corresponding mobile phone number to be present in the native channel. In another illustrative example, an instance of browsing of a Website corresponding to the product and/or service may result in determination of the customer associated with the corresponding login information and/or IP address to be present in the Web channel. In an embodiment, the presence of the customer in one or more interaction channels is stored as presence information in the memory 204.

In an embodiment, the processor 202 is configured to, with the content of the memory 204, cause the apparatus 200 to determine attention information corresponding to the customer in connection with the presence information, where the attention information is indicative of a current attention of the customer. For example, even though the customer has logged in one or more social media accounts, the customer may be currently browsing a Website. In this case, the apparatus 200 is caused to determine that the attention information is based on the Web channel. The apparatus 200 may store the presence information, as well as the attention information, in the memory 204.

In an embodiment, the processor 202 is configured to, with the content of the memory 204, cause the apparatus 200 to track and update the presence information and the attention information corresponding to the customer. In an embodiment, the presence information and the attention information may be used to determine an interaction channel in which the customer is most active or most likely to be active.

In an embodiment, the apparatus 200 is caused to provide a notification to the customer on the interaction channel in which the customer is most active or most likely to be active. For example, upon determining that the customer is active on the social channel, for example based on the determined presence and attention information, the apparatus 200 provisions the notification on the social networking media account of the customer. In an embodiment, the apparatus 200 may take into consideration the nature of notification content prior to provisioning the notification on the interaction channel on which the customer is active. For example, if the notification corresponds to bill payment information, then the apparatus 200 provisions the request in a personal manner, such as for example by using a chat channel in the social networking media account, as opposed to provisioning the request in a public manner in which the notification is visible to other users, for example by posting on the wall of the customer's social networking media account. Alternatively, if the notification corresponds to an attractive offer on a product or a service, the notification may be posted on the wall of the customer's social networking media account. As explained above, the apparatus 200 provisions the notification on an interaction channel on which the customer is currently active or most likely to be active.

The provisioning of the notification to the customer by the apparatus 200 may not be limited to a single device associated with the customer. For example, in an example scenario, if the customer is determined to be currently active, or predicted to be present and/or attentive, on a smartphone, then the apparatus 200 provisions the notification to the customer on the customer's smartphone screen. In another example scenario, if the customer is determined to be currently active, or predicted to be present and/or attentive, on a tablet device, then the apparatus 200 provisions the notification to the customer on the customer's tablet device screen. In another example scenario, if the customer is determined to be currently active, or predicted to be present and/or attentive, on both a smartphone and a tablet device, then the apparatus 200 provisions the notification to the customer on either one or both of the customer's smartphone screen and tablet device screen, based on the prediction of the best recommended treatment for that customer based on their persona, intent, journey, context, history, and the like, which may enable the customer to have the least one of cognitive effort and activity effort moving forward in their journey.

In an embodiment, the notification is configured to be responsive to at least one of the customer's preference for a type of content, a presentation of the content, an interaction mode, for example, device and/or interaction channel preference, and a time for receiving the said notification. In an embodiment, the apparatus 200 determines the type and the content of notifications to be sent to the customer based on the stored customer information and the inferred intent of the customer. For example, the notification is a passive notification or an active notification, where the passive notification provides useful information to the customer and, where the active notification prompts the customer to perform an action, complete an action, and/or confirm an action that has been completed automatically on the customer's behalf. For example, if the customer is to be notified of payment of a bill, then the apparatus 200 may configure the type of notification to be a passive notification and thus inform the customer of the bill due date. However, if the bill payment is due for next day, then the apparatus 200 may configure the notification to be an active notification by prompting the customer to take immediate action. For example, the active notification may include a hyperlink which may direct the customer to a Website for paying the bill. Alternatively, the active notification may be configured with clickable widget, which may direct the customer to an agent for enabling the customer to pay the bill. In other illustrative example, if it is inferred that the customer is interested in purchasing a product or availing a service, then the apparatus 200 may configure an active notification to facilitate an interaction with an agent, for example a chat interaction or a voice interaction with an IVR system or an agent, to enable the customer to complete the purchase.

In addition to the type of notification, the apparatus 200 may configure the content of notifications to generate optimum response from the customer for an identified persona. For example, a notification corresponding to an attractive offer for a product or a service may be complemented with information such as, for example, pictures of friends of customers who also bought the product or availed the service, personal and professional information relating to customer such as, for example, birthdays, anniversaries, change in professional task's or environment, and the like. Similarly, current location information or calendar information of the customer may be used to generate notification content that is relevant for the customer's current location and schedule.

In an embodiment, the apparatus 200 predicts a time duration for which the customer is expected to be attentive to the notification and, thereafter, configures the presentation of the content to optimize a use of the time for which the customer is predicted to be attentive. More specifically, a design of notification may be configured in a manner that optimizes use of the time for which the customer is predicted to be attentive to the notification. Accordingly, a window size color, length of textual content, type of content, for example video content, image content, or textual content, and the like, may be optimally selected by the apparatus 200.

As explained above, the notifications may be one of active notifications and passive notifications. In an embodiment, the active notification may include a request for an interaction with a customer support representative. In an illustrative example, if the customer is browsing a Website, then a widget may be provisioned to the customer requesting the customer's permission to allow interaction with an agent and/or IVR system. In another illustrative example, if the customer is accessing an SMS notification or invoking a native mobile application, then a pop-up window displaying a textual request that allows interaction with an agent and/or IVR system may be provisioned to the customer in the SMS channel. In another embodiment, the request for interaction may be provisioned while taking into account a customer's historic mode, i.e. device and interaction channel, preferences for customer service interactions. For example, a customer may prefer conducting the interactions over a voice call, i.e. a speech channel preference, whereas another customer may prefer to interact with customer service representatives over chat, i.e. a messaging medium preference.

Similarly, customers may have varied device preferences, e.g. some customers may prefer to be contacted over phone, whereas some customers may prefer chatting over a personal computer. Accordingly, the notification may suggest conducting the interaction over a particular channel and/or device preferred by the customer. In an illustrative example, if a customer is already active in one interaction channel and is identified in one or more other interaction channels, the active notification can be sent either via the original first interaction channel or to any one or more of the other interaction channels based on a prediction of the most effective, lowest cognitive and activity effort method to engage the customer. In an illustrative example, if a customer has called into the IVR system and is identified to be present on a tablet device, then the active notification may be provided in the IVR channel directing the customer to accept the notification, with focus to the tablet device, or the active notification could be provided directly on the tablet device, or both. In an illustrative example, if the customer has been identified to be active in a messaging channel and if the customer's historical preference for interactions has been identified to be speech channel, then an active notification may be sent on the messaging channel itself, including text such as 'Would you like our customer service representative to call you to discuss your requirements?' In another illustrative example, if the customer has been identified to be active in the native channel on a tablet device and if the customer's historical preference for interactions has been identified to be the chat channel, then a request for an interaction may be sent on the native channel itself, including text such as 'Would you like to chat with our customer service representative to discuss your requirements?' Accordingly, in some embodiments, the active notifications may also suggest a day and/or time for scheduling the interaction. The customer may choose to ignore or act on the notification provisioned by the apparatus 200. In an embodiment, the apparatus 200 is caused to receive the customer response, for example one of an approval for interaction with the agent/IVR system or an ignoring of the notification.

In an embodiment, the apparatus 200 initiates interaction with the customer upon reception of an approval for interaction from the customer. For example, the apparatus 200 initiates a voice call conversation between an agent and/or IVR system and the customer upon learning of the approval of the request for interaction by the customer. In an illustrative example, the apparatus 200 places a toll free voice call from the agent and/or IVR system's behalf to the customer to initiate the interaction. In an embodiment, the voice call initiated between the agent and/or IVR system and the customer may be executed as a natural language conversation. For example, the IVR system may query the customer as to what action or actions the customer wants to perform. In an illustrative example, the IVR system may query the customer by using a phrase such as 'How may I help you?' The customer may respond to the query using a natural language response, which may be in any form and use any terms, which are comfortable for the customer. The IVR system may then convert the response into text and use techniques that are based on a special grammar that is trained to identify certain keywords more accurately than others. An example of one such grammar type is that of statistical language models (SLM) which takes into consideration the sequence of words to get the best transcription. In an embodiment, the interaction initiated by the apparatus 200 may be embodied as a chat conversation. In another embodiment, the interaction initiated by the apparatus 200 may be embodied as a Web or a digital self-assistance based interaction.

In an embodiment, the customer may initiate the interaction with the agent and/or IVR system upon receiving the notification from the apparatus 200. In an embodiment, the apparatus 200 is caused to determine the best interaction mode, as well as the customer preferred interaction mode, for conducting the interaction. In an embodiment, the apparatus 200 may suggest diverting the initiated interaction to another interaction channel and/or device based on the said determination.

In another embodiment, the apparatus 200 facilitates or establishes a tie between interaction modes allowing for communication via one interaction mode, for example a first interaction mode, to be augmented or transferred to another interaction mode, for example a second interaction mode, that may be more optimal. The alternative interaction channel may contain a different mode of communication. For example, verbal communication in an IVR system can be augmented with pertinent graphical images presented through a Web browser in a coincident Web session. For example, if it is determined that the customer can be better served by using other interaction modes than that with which the customer is concurrently interacting, then the apparatus 200 offers integrated services to the customer by using both the current interaction modes and the other interaction modes, or the apparatus 200 diverts the customer to the other interaction mode from the interaction mode with which customer is concurrently interacting. If the customer is interacting on two interaction channels at once, the apparatus 200 uses multi-channel data to coordinate the experience across the two or more interaction channels. For example, if the product shopper still has a Web page open when the call is made to the IVR system, the IVR system can offer a deal on a particular product model and simultaneously push the Web browser to the Web page for that product. This is possible because the IVR phone call is from a phone number that is associated with the HTTP cookie for that Web browser.

In an illustrative example, the apparatus 200 supplements or diverts a customer call to a linked Web session. The linked Web session may be established by forwarding the corresponding Web links or content to the customer via SMS or email, by asking and/or instructing the customer to visit a personalized Web page, by opening a preconfigured Web page whenever the customer calls a predefined number, by a registered customer device initiating a linked session in response to the request from a customer support representative, or by the customer initiating a session on the customer's device and linking the session. In an embodiment, the Web sessions may be automated as well as agent-guided, Web sessions.

In an embodiment, the apparatus 200 may authenticate the customer during addition of an interaction channel or where customer is interacting via a device, which can be used by other customers. For example, consider a phone call interaction that contains customer authentication. When a mobile Web experience is added to this existing phone call, authentication may be achieved by virtue of the phone call continuing along with the Web interaction. Further, for security reasons the mobile Web experience may last only for the duration of the call. In some embodiments, where the Web experience is on a different device than the phone, for example desktop or laptop, authentication may be achieved by sending email with a microsite uniform resource locator (URL) to the registered email account for the customer. Alternatively, a unique URL may be provided to the customer on the phone call, which may last only for the duration of the phone call. It is understood that other modes of authentication such as bio-metric data, facial/speech recognition and the like may also be used to facilitate such linked interaction sessions.

In an embodiment, the apparatus 200 creates, captures, and/or passes unique identifiers between multiple contact channels, such as Web, mobile, IVR, phone, automotive, television, and the like, to identify and tag the customer and their context, e.g. history, past behavior, steps progressed, obstacles and/or issues encountered, etc., uniquely. In an embodiment, the unique identifiers may be used to create linkages across mediums and devices within the same session, as well as across sessions probabilistically based on machine learning and statistical models driven by behavior and other attributes of customer journeys. Examples of various unique identifiers may include, but are not limited to IP address, user-agent, Web cookies, third party Web cookies, order IDs, request IDs, various personally identifiable information (PII), mobile device identifiers, and the like. The creating, passing, and matching of unique identifiers to unique customers enables the seamless transfer of context, experience, history, action, interaction information, and authentication information between separate interaction modes such as, for example, the first interaction mode and the second interaction mode, that customers typically use to engage with enterprises and/or businesses.

In an embodiment, the processor 202 is configured to, with the content of the memory 204, cause the apparatus 200 to predict intention (also referred to herein as intent) of the customer for being present on the one or more interaction channels. In addition to interaction data from the current and/or on-going customer interactions, the apparatus 200 mines stored information corresponding to the customers and their interactions, i.e. interaction data. The stored information may be subjected to a set of text mining and predictive models (hereinafter collectively referred to as prediction models) for mining relevant information that drive the prediction of the customer intent. Examples of the prediction models may include prediction models based on algorithms including, but not limited to algorithms such as Logistic regression, Naïve Bayesian, Rule Engines, neural networks, decision trees, support vector machines, k-nearest neighbor, K-means, and the like. The prediction models may also be configured to extract certain features from the customer interactions or from the agent interactions or from both customer and agent interactions. Further, the prediction models may be configured to extract features by using a relationship between the customer and agent interactions, for example sentiment of the customer for a given agent response. Examples of the features that may be fed into the prediction models may include, but are not limited to, any combinations of words features such as n-grams, unigrams, bigrams and trigrams, word phrases, part-of-speech of words, sentiment of words, sentiment of sentences, position of words, customer keyword searches, customer click data, customer Web journeys, the customer interaction history, and the like. In an embodiment, the prediction models may use any combination of the above-mentioned input features along with the customer interaction data such as, but not limited to, which agent handled the dialogue, what the outcome was, interaction transfers if any and the likelihood of predicting the customer's intents. The mined information enables the apparatus 200 to infer intents of the customers for being present in the interaction channel.

In an embodiment, the apparatus 200 provisions a variety of notifications based on the predicted customer issue, device availability, location, and predicted best mode of interaction. In an embodiment, in addition to predicting the intent, the apparatus 200 predicts the best mode of interaction affiliated with the customer. More specifically, the apparatus 200 predicts the best interaction channel, as well as which device the customer is most likely to use for receiving the notification or for interacting with a customer support representative. In an embodiment, the apparatus 200 predicts the best mode of interaction given the nature of the interaction, presence information, and the attention information corresponding to the customer. For example, given the nature of the interaction, if a voice medium is better mode of interaction than the currently preferred chat medium, then the apparatus 200 may suggest the voice medium to facilitate the interaction.

In an embodiment, the apparatus 200 receives location information corresponding to a current location of a customer. In some example embodiments, the apparatus 200 obtains the location of the customer from the customer device which may, for example, detect the location of the customer using a global positioning system (GPS) or other triangulation techniques, and provide such location information to the apparatus 200. The location of the customer may also be determined by a native application that is running on the customer device. The native application may work independently or in coordination with systems operated by the telecommunications provider. Such location information may be used for configuring the notifications. For example, the apparatus 200 may determine a customer preference of an interaction mode for receiving the notification based on the location information.

In an embodiment, determining the customer preference of the interaction mode includes determining a preferred interaction channel from among the plurality of interaction channels and a device accessible by the customer for receiving the notification. For example, if a customer has been identified to have swiped a credit card at a gas station, then it may be deduced that the customer is currently on the street and accordingly may not prefer notifications in certain interaction channels, such as the chat channel. Similarly, if the customer has been identified to be currently at a location remote from the locations typically associated with the customer, then a time zone of the customer's current location may be taken into account while determining the best time and the interaction medium for provisioning the notification.

The apparatus 200 is caused to provision notifications on any device accessible by the customer. In an embodiment, the device accessible by the customer may be owned by the customer or may include any electronic device disposed in a public location. For example, in an example scenario, if the customer is determined to be currently active, or predicted to be present and/or attentive, on an interactive screen in an aircraft based on mined flight and/or seat information corresponding to the customer, then the apparatus 200 provisions the notification to the customer on the interactive screen. In another illustrative example, the apparatus 200 provisions notifications on interactive screens of public electronic devices disposed in shopping centers, offices, banks, or any such other public places, where the customer is currently active and where such interactive screens can be publicly used by other users and/or customers. Accordingly, the best interaction channel determined and/or predicted for provisioning notification may include any medium and/or device currently associated or most likely to be associated with the customer.

In an embodiment, the apparatus 200 determines one or more personas associated with a customer based on customer activity on a plurality of interaction channels. The apparatus 200 analyzes the interaction data and the profile information to identify behavioral traits exhibited by the customer during various interaction scenarios and, accordingly, determine one or more personas associated with the customer. For example, the customer may assume a persona of a bargain shopper when at a discount store, whereas the same customer may assume a persona of a high net-worth individual when buying a suit at a premium clothing store.

In another example scenario, a customer may exhibit markedly different risk preferences in their own accounts, such as accounts related to a retirement fund, a holiday savings fund, and an education savings investment. In an embodiment, the apparatus 200 is further caused to generate and maintain one or more persona profiles corresponding to the one or more personas, where each persona profile is representative of a set of behavioral traits exhibited substantially consistently by the customer when inhabiting a persona. In an embodiment, the set of behavioral traits comprises behavioral traits related to at least one of customer preference, likely actions of the customer, and likely needs of the customer. In an embodiment, the presence and/or attention information corresponding to the customer is collated for the persona present therein and notifications are provided to the customer accordingly.

In an embodiment, the various components of the apparatus 200 may be implemented as a fully distributed system across different geographic locations. In an alternate embodiment, the apparatus 200 may be embodied as a monolithic centralized platform. In another embodiment, the apparatus 200 may be embodied as a mix of existing open systems, proprietary systems, and third party systems. In another embodiment, the apparatus 200 may be implemented completely as a set of software layers on top of existing hardware systems.

Figure 3:
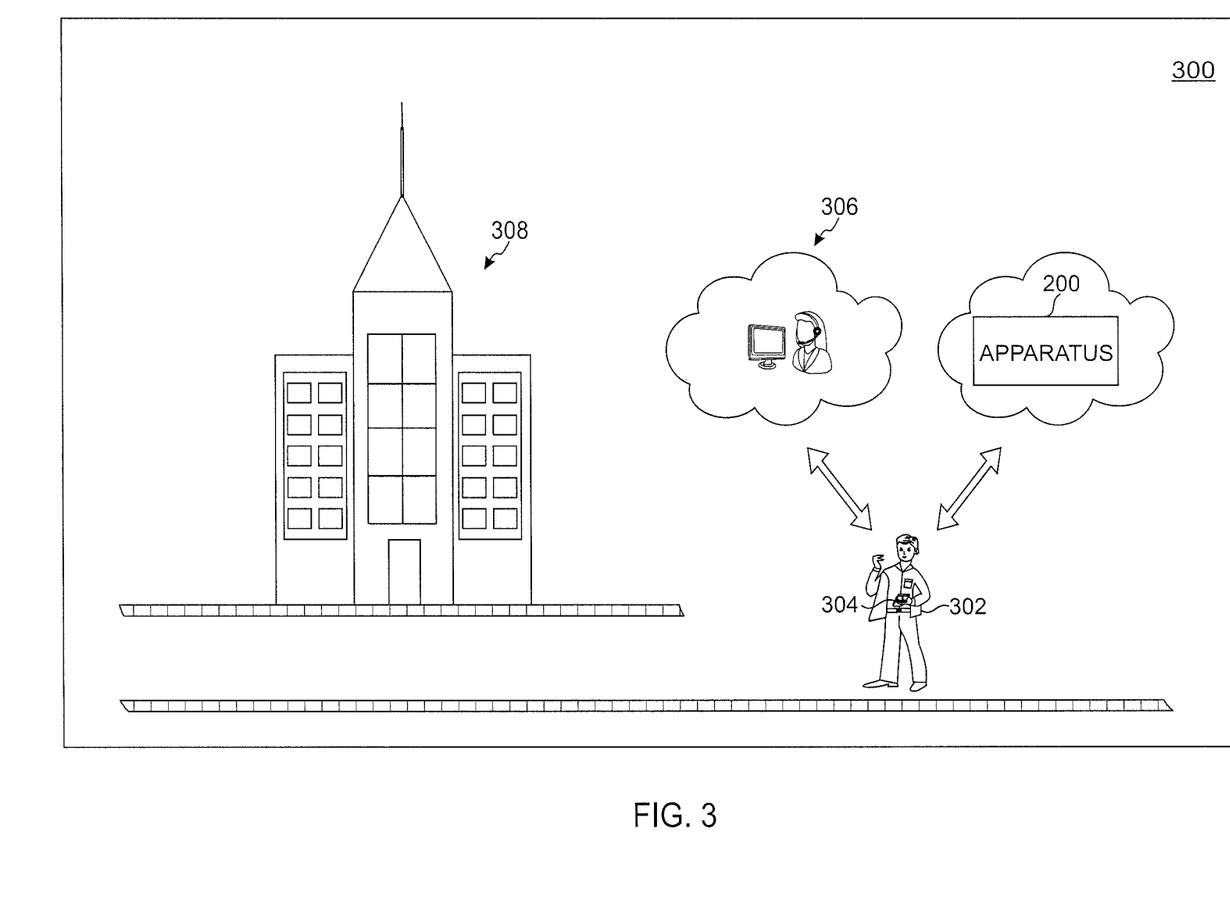
FIG. 3 shows a schematic representation of an exemplary scenario for illustrating a provisioning of a notification to a customer by the apparatus of FIG. 2 in accordance with an embodiment of the invention.

FIG. 3 is a schematic representation 300 of an exemplary scenario for illustrating a provisioning of a notification to a customer 302 by the apparatus 200 of FIG. 2 in accordance with an embodiment of the invention. More specifically, the schematic representation 300 depicts the customer 302 accessing a fitness application on an electronic device 304, exemplarily depicted to be a tablet device, associated with the customer 302. Accordingly, the customer 302 is deemed to be present in the native channel. The customer 302 may also concurrently access or interact with Websites on the electronic device 304 that showcase healthy foods to consume for working professionals. Accordingly, the customer 302 is also deemed to be present in the Web channel.

As explained with reference to FIG. 2, the apparatus 200 determines, in addition to presence information, attention information indicative of current attention of the customer 302. The apparatus 200 may then provide the one or more notifications to the customer 302 in the interaction channel in which the customer 302 is currently active or most likely to be active. If the determined attention information indicates that the customer 302 is currently active in the Web channel, then the apparatus 200 provides a notification in the Web channel as opposed to the native channel. Moreover, as explained with reference to FIG. 2, the notifications provided by the apparatus 200 are responsive to the customer's preference for a type of content, a presentation of content, a medium of interaction, and the like.

In an embodiment, the apparatus 200 provides a notification to the customer 302 that is related to a health insurance policy which is due. The notification may be an active notification or a passive notification, as explained with reference to FIG. 2. For example, if the bill is due for next day, then the apparatus 200 may provide an active notification that prompts a customer action and/or response. However, if the bill is due next week, then the apparatus 200 may provide a passive notification that informs the customer 302 of the bill payment due date.

Further, the apparatus 200 may determine location information corresponding to the customer 302. Upon determining the location information and detecting that the customer 302 is, for example, on the street, the apparatus 200 may determine that the content of the active notification suggests that the customer 302 prefers a voice call rather than a chat. Accordingly, the active notification may include a request for initiating a call with a human agent, such as a live agent 306. The customer 302 may choose to approve or reject such a request. In an embodiment, the apparatus 200 may provide a link which, upon access, may provide walking directions to an enterprise facility, such as the facility 308, near the customer's current location to facilitate bill payment on the insurance policy. In an embodiment, the apparatus 200 may provide notifications related to informational fitness tips, suggestions for eating healthy food nearby, and the like. An example provisioning of a passive notification to a customer is depicted in FIG. 4.

Figure 4:
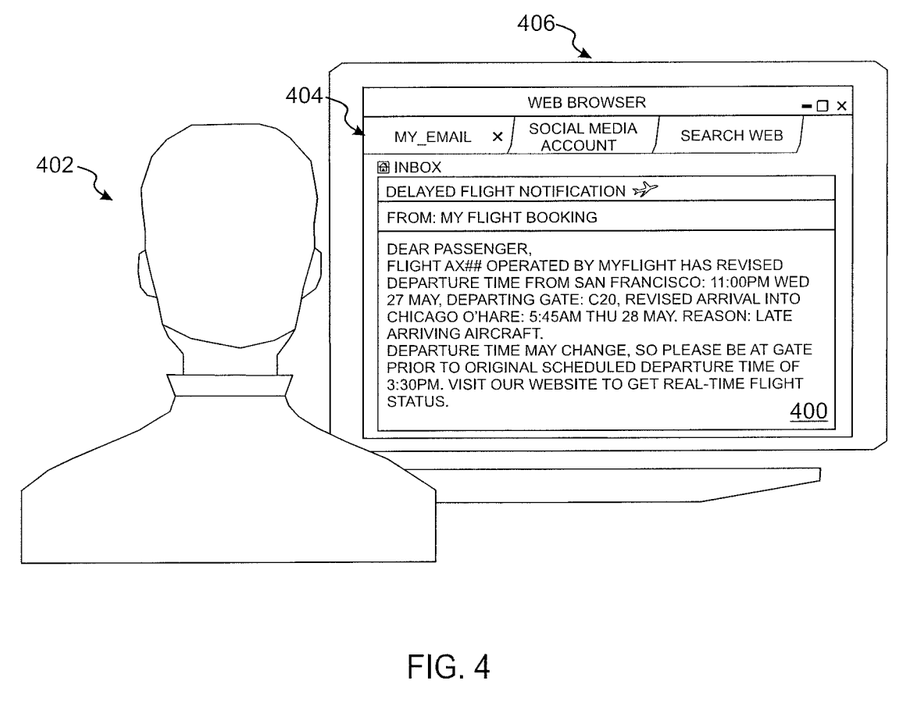
FIG. 4 illustrates an example provisioning of a passive notification to a customer in accordance with an embodiment of the invention.

FIG. 4 illustrates an example provisioning of a passive notification 400 to a customer 402 in accordance with an embodiment of the invention. Accordingly, FIG. 4 depicts the customer 402 accessing a personal email account 404 on an electronic device 406, exemplarily depicted to be a desktop computer, that is associated with the customer 402. The customer 402 may also simultaneously indulge in surfing Web pages and checking updates on a social network account while accessing the personal email account 404.

As explained with reference to FIG. 2, the apparatus 200 checks for presence of customers in a plurality of interaction channels in an on-going manner. Accordingly, the apparatus 200 may detect presence of the customer 402 in the email channel, the Web channel, and the social media channel and store the detected presence in these channels as presence information. Further, the apparatus 200 determines attention information corresponding to the customer 402. In an example scenario, the apparatus 200 may determine that the customer 402 is currently active in the email channel. The apparatus 200 may further predict a time duration for which the customer 402 is expected to be active in the email channel, for example based on historical data on time spent of emails for given time slots within a day, month, year, etc. If it is determined that the customer 402 is likely to be active in the email channel, then the apparatus 200 may display a passive notification 400 to the customer 402 on the email channel. In FIG. 4, the passive notification 400 is depicted to assume an email form, however, it is understood that passive notifications may assume various forms, such as for example pop-ups, clickable widgets, infographics, and the like. As explained with reference to FIG. 2, passive notifications are configured to provide useful information to the customers. Accordingly, in this example the passive notification 400 provides useful information related to an impending air travel event associated with the customer 402. It is understood that the content of the passive notifications, such as the passive notification 400 is provided herein for example purposes and that the passive notifications may include various types of content.

Although the passive notification 400 is shown as being provided to the customer 402 in the email channel and on the desktop computer, in some embodiments, the apparatus 200 predicts the channel and/or device preferred by the customer 402 for receiving such notifications and, accordingly, provides the customer 402 with notifications over the preferred interaction mode. For example, if the customer 402 prefers a chat channel, then the apparatus 200 may initiate a chat interaction with the customer 402 within the email channel and provide a notification to the customer 402 using a chat interface. An example provisioning of an active notification to a customer is explained with reference to FIG. 5.

Figure 5:
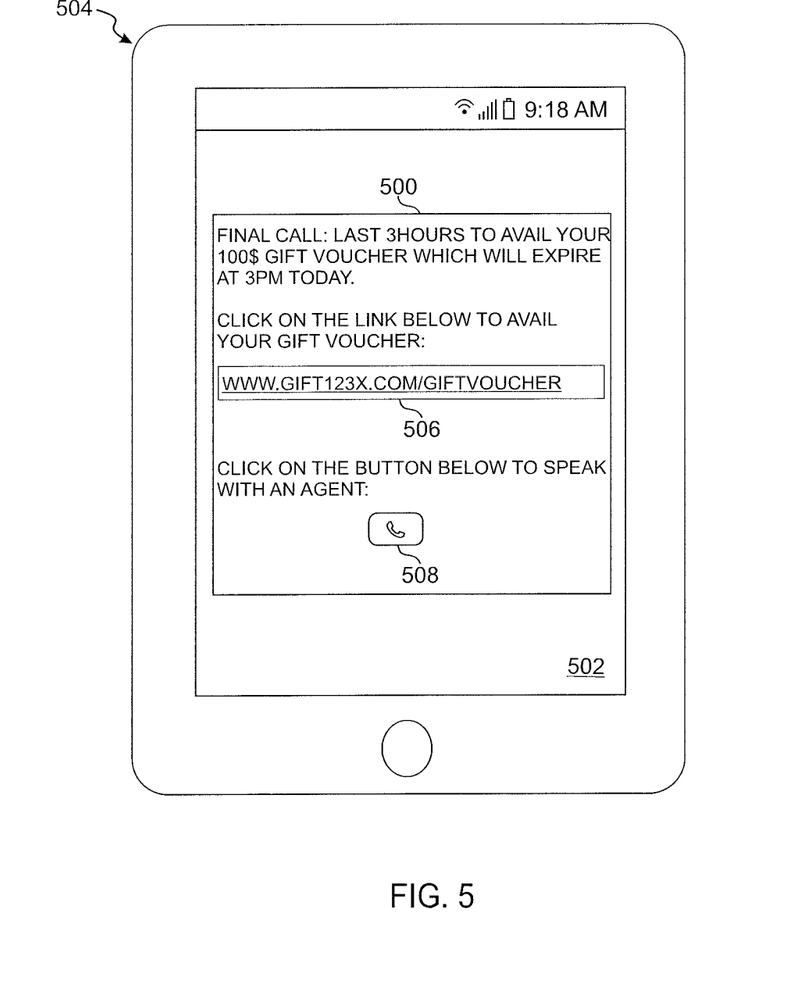
FIG. 5 illustrates an example active notification provisioned to a customer on a customer device screen in accordance with an embodiment of the invention.

FIG. 5 shows an example active notification 500 provisioned to a customer on a customer device screen 502 in accordance with an embodiment of the invention. As explained with reference to FIG. 2, the apparatus 200 tracks presence information and attention information of the customer in a plurality of interaction channels and provides a notification to the customer in an interaction channel in which the customer is currently active or most likely to be active. Accordingly, in an example scenario, the apparatus 200 may detect the presence of the customer in the native channel, i.e. logged into a native software application on a mobile device 506, and store the presence of the customer in the native channel as presence information. Further, the apparatus 200 may determine that the customer is currently active in the native channel. Upon such a determination, the apparatus 200 may provision a notification, such as the active notification 500, to the customer on the mobile device 506 that is associated with the native application. As explained with reference to FIG. 2, an active notification is configured to prompt the customer to perform an action.

Accordingly, the active notification 500 alerts the user of limited time left in availing a gift voucher and further provides the customer with two options to avail the gift voucher. The customer may either click on the Web link 506 to avail the gift voucher or access a clickable button 508 to initiate an interaction with a customer support representative, such as a human agent or an IVR system, to avail the gift voucher. Further, as explained with reference to FIG. 2, the interaction with the customer support representative over a phone channel may be augmented with a Web channel, for example a linked Web session, or may be transferred to the Web channel to enable the customer to avail the gift voucher before a time eligibility for availing the gift voucher expires. Such a manner of provisioning a notification to the customer while taking customer's preference into account provides an improved interaction experience to the customer. A method for providing customer notifications is explained with reference to FIG. 6.

Figure 6:
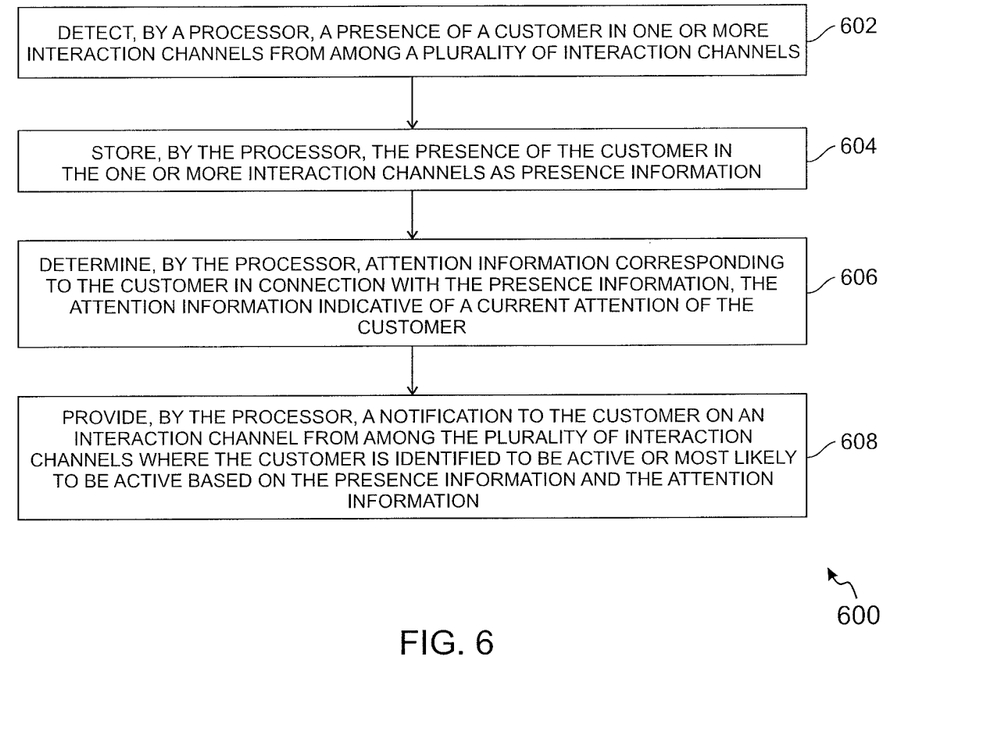
FIG. 6 illustrates a flow diagram of an example method for providing a notification to a customer in accordance with an embodiment of the invention.

FIG. 6 illustrates a flow diagram of an example method 600 for providing a notification to a customer in accordance with an example embodiment. The method 600 depicted in the flow diagram may be executed by, for example, the apparatus 200 explained with reference to FIGS. 2 to 5. Operations of the flow diagram, and combinations of operation in the flow diagram, may be implemented by, for example, hardware, firmware, a processor, circuitry and/or a different device associated with the execution of software that includes one or more computer program instructions. The operations of the method 600 are described herein with help of the apparatus 200. For example, one or more operations corresponding to the method 600 are explained herein to be executed by a processor, such as the processor 202 of the apparatus 200. It is noted that though the one or more operations are explained herein to be executed by the processor alone, it is understood that the processor is associated with a memory, such as the memory 204 of the apparatus 200, which is configured to store machine executable instructions for facilitating the execution of the one or more operations. It is also noted that, the operations of the method 600 can be described and/or practiced by using an apparatus other than the apparatus 200. The method 600 starts at operation 602.

At operation 602, the presence of a customer is detected by a processor in one or more interaction channels from among a plurality of interaction channels. In an embodiment, the processor actively probes the presence of the customer in any of the interaction channels. For example, the processor may track invoking of native mobile applications that correspond to a chosen product and/or service in electronic devices that are associated with the customers. Upon identifying an instance of invoking of a native mobile application in an electronic device associated with a customer, the processor may determine the presence of the customer in the native channel. In another illustrative example, if the processor identifies an instance of a customer browsing a Website corresponding to the selected product and/or service, then the processor may determine the presence of the customer in the Web channel.

In an embodiment, one or more tracking cookies may be configured to be included in a device browser associated with the customer device, which may enable the processor to identify the presence of the customer in an interaction channel. Determining the presence of the customer in an interaction channel may be performed by the processor based on stored data corresponding to the customer. As explained with reference to FIG. 2, a stored customer's profile information may include personal details, such as name, mailing address, contact information such as mobile phone number, login id, IP address, and the like. Accordingly, an instance of invoking a native mobile application in a mobile phone may result in determination of the customer associated with the corresponding mobile phone number to be present in the native channel. In another illustrative example, an instance of browsing of a Website corresponding to the product and/or service may result in determination of the customer associated with the corresponding login information and/or IP address to be present in the Web channel.

At operation 604, the presence of the customer in the one or more interaction channels is stored by the processor as presence information. At operation 606, attention information corresponding to the customer is determined in connection with the presence information by the processor. As explained in FIG. 2, the attention information is indicative of a current attention of the customer. For example, even though the customer has logged in one or more social media accounts, the customer may be currently browsing a Website. In such case, the processor determines the attention information as the Web channel. The attention information may be stored along with the presence information in a memory, such as the memory 204 associated with the apparatus 200, as explained in FIG. 2. Further, the presence information and the attention information corresponding to the customer are tracked and updated. In an embodiment, the presence information and the attention information may be used to determine an interaction channel in which the customer is most active or most likely to be active.

At operation 608, a notification is provided by the processor to the customer on an interaction channel from among the plurality of interaction channels where the customer is identified to be active or most likely to be active based on the presence information and the attention information. For example, upon determining that the customer is active on the social channel, for example based on the determined presence and attention information, the notification is provided on the social networking media account of the customer. In an embodiment, a nature of notification content may be taken into consideration prior to provisioning the notification on the interaction channel on which the customer is active. In an embodiment, the notification is configured to be responsive to at least one of the customer's preference for a type of content, a presentation of the content, an interaction mode, for example device and/or interaction channel preference, and a time for receiving the said notification. Such provisioning of notifications to customers may be provided as explained with reference to FIG. 2.

In an embodiment, a time duration for which the customer is expected to be attentive to the notification is predicted and, thereafter, the presentation of content to optimize use of the time duration for which the customer is predicted to be attentive may be configured. More specifically, a design of notification may be configured in a manner that optimizes a use of the time duration for which the customer is predicted to be attentive to the notification. Accordingly, a window size color, length of textual content, type of content, for example video content, image content or textual content, and the like, may be optimally selected.

In an embodiment, the type and the content of notifications to be sent to the customer are determined based on the personal identification information, stored customer information and the inferred intent of the customer. For example, the notification is configured to be a passive notification or an active notification, where the passive notification is configured to provide useful information to the customer and, where the active notification is configured to prompt the customer to perform an action. The provisioning of active and passive notifications may be performed as explained with reference to FIGS. 2, 4, and 5. Further, the inclusion of request for interaction with customer service representatives and linking of concurrent and/or sequential interactions may be performed as explained with reference to FIG. 2.

In addition to the type of notification, the content of notifications may be configured to generate optimum response from the customer for an identified persona. For example, a notification corresponding to an attractive offer for a product or a service may be complimented with information, such as for example, pictures of friends of customers who also bought the product or availed the service, personal and professional information relating to customer such as for example birthdays, anniversaries, and the like. Similarly, current location information or calendar information of the customer may be used to generate notification content that is relevant for the customer's current location and schedule.

In an embodiment, the processor receives location information corresponding to a current location of a customer. In some example embodiments, the processor obtains the location of the customer from the customer device which may, for example, detect the location of the customer with a global positioning system (GPS) or other triangulation techniques and provide such location information to the processor. The location of the customer may also be determined by a native application that is running on the customer device. The native application may work independently or in coordination with systems operated by the telecommunications provider. Such location information may be use to configure the notifications as explained with reference to FIG. 2. In an embodiment, determining the customer preference of the interaction mode includes determining a preferred interaction channel from among the plurality of interaction channels and a device accessible by the customer for receiving the notification. Further, the best interaction channel determined and/or predicted for provisioning notification may include any medium and/or device currently associated or most likely to be associated with the customer.

Without in any way limiting the scope, interpretation, or application of the claims appearing below, advantages of one or more of the exemplary embodiments disclosed herein include providing customer notifications while taking customer's preferences into account. Various embodiments disclosed herein provide numerous advantages for enhancing a customer service experience, thereby contributing to increased attributable revenue, increased resolution rates, increased efficiency, decreased cost of service and cost of sales, increased loyalty and retention, deepened relationship, and increased live time value. The techniques disclosed herein suggest notifying and/or interacting with customers in a medium where the customer is active or most likely to be active. Moreover, the interaction is conducted in a manner preferred by the customer and most suited to the content of the notification. Accordingly, apparatuses and methods disclosed herein take customer's preference into account prior to sending notifications to the customers. By taking the customer's preferences into account, the notifications have a far greater likelihood of serving their intended purpose. Moreover, by detecting customer presence and attention information, a likelihood of the customer missing out on important communication is also drastically reduced. The notifications and/or interactions conducted in such a manner may positively influence a customer's mood and even may result in favorable customer reaction to the product or service being referred to by the agent/IVR system. Accordingly a quality of customer sales and/or service experience may be improved providing benefits to both the customers and the enterprises.

Although the present technology has been described with reference to specific exemplary embodiments, it is noted that various modifications and changes may be made to these embodiments without departing from the broad spirit and scope of the present technology. For example, the various operations, blocks, etc., described herein may be enabled and operated using hardware circuitry, for example complementary metal oxide semiconductor (CMOS) based logic circuitry, firmware, software and/or any combination of hardware, firmware, and/or software, for example embodied in a machine-readable medium. For example, the apparatuses and methods may be embodied using transistors, logic gates, and electrical circuits, for example application specific integrated circuit (ASIC) circuitry and/or in Digital Signal Processor (DSP) circuitry.

Particularly, the apparatus 200, the processor 202 and the memory 204 may be enabled using software and/or using transistors, logic gates, and electrical circuits, for example integrated circuit circuitry such as ASIC circuitry. Various embodiments of the present technology may include one or more computer programs stored or otherwise embodied on a computer-readable medium, wherein the computer programs are configured to cause a processor or computer to perform one or more operations, for example operations explained herein with reference to FIG. 6.

A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media, such as floppy disks, magnetic tapes, hard disk drives, etc., optical magnetic storage media, e.g. magneto-optical disks, CD-ROM (compact disc read only memory), CD-R (compact disc recordable), CD-R/W (compact disc rewritable), DVD (Digital Versatile Disc), BD (Blu-ray® Disc), and semiconductor memories, such as mask ROM, PROM (programmable ROM), EPROM (erasable PROM), flash ROM, RAM (random access memory), etc. Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line, e.g. electric wires, and optical fibers, or a wireless communication line.

Various embodiments of the invention, as discussed above, may be practiced with steps and/or operations in a different order, and/or with hardware elements in configurations which are different than those which are disclosed. Therefore, although the technology has been described based upon these exemplary embodiments, it is noted that certain modifications, variations, and alternative constructions may be apparent and well within the spirit and scope of the technology.

Although various exemplary embodiments of the present invention are described herein in a language specific to structural features and/or methodological acts, the subject matter defined in the appended claims is not necessarily limited to the specific features or acts described above. Rather, the specific features and acts described above are disclosed as exemplary forms of implementing the claimed invention.

The invention claimed is:

1. A computer-implemented method for providing notifications on a plurality of interaction channels, the method comprising:
   detecting, by a processor, that each of the plurality of interaction channels including a web-based channel, a native application-based channel, or a voice-based channel are concurrently active, indicating availability to receive notifications on an interaction channel;
   storing, in a memory, information indicating the concurrently active plurality of interaction channels;
   configuring prediction models to extract features comprising a combination of n-grams, unigrams, bigrams, and trigrams from the stored information and interactions on one or more of the plurality of interaction channels;
   mining the stored information and the interactions using the extracted features;
   predicting activity, using the prediction models, on one or more of the plurality of interaction channels based on the mining;
   creating, by the processor, communication linkages across the one or more of the plurality of interaction channels probabilistically based on machine learning and statistical models driven by the activity and attributes of Web activity on the plurality of interaction channels, wherein the attributes of Web activity include unique identifiers operable to be matched with the one or more of the plurality of interaction channels, wherein the unique identifiers include Web cookies, and wherein the communication linkages are configured to transfer content between the plurality of interaction channels;
   automatically determining, by the processor, based on the mining and the communication linkages across the one or more of the plurality of interaction channels, interaction information for the one or more of the plurality of interaction channels, where the interaction information indicates the current active interactions on an interaction channel, and the stored information indicates that each of the one or more of the plurality of interaction channels are concurrently active such that only one of the one or more of the plurality of interaction channels has the interactions at any point in time;
   determining, based on the stored information and the interaction information, that a first interaction channel from among the one or more of the plurality of interaction channels is active but does not have the interactions;
   initiating, by the processor, notification on a first interaction channel from among the one or more of the interaction channels, wherein the first interaction channel was determined as being active but not having the interactions, wherein initiating the notification on the first interaction channel further comprises:
      matching the unique identifiers with the first interaction channel;
      detecting, by the processor, a second interaction channel from among the one or more of the plurality of interaction channels as being active and having the interactions based on the stored information and the interaction information; and
      in response to determining that the first interaction channel lacks the interactions and based on matching the one or more unique identifiers with the second interaction channel, automatically provisioning the notification to the second interaction channel that has the interactions.

2. The method of claim 1, further comprising any of:
   configuring the notification as a passive notification that provides useful information to a device; and
   configuring the notification as an active notification that prompts an action.

3. The method of claim 2, further comprising:
   configuring the active notification to comprise a request for an interaction with a representative.

4. The method of claim 3, wherein the interaction corresponds to a natural language based interaction between the device and the representative.

5. The method of claim 3, further comprising:
   configuring the request for the interaction to comprise a suggestion for conducting the interaction over a preferred interaction mode and at a preferred interaction time.

6. The method of claim 5, further comprising:
   facilitating by the processor, upon initiation of the interaction between the device and the representative over a first interaction mode, any of:
   augmenting the first interaction mode with a second interaction mode; and
   transferring the interaction from the first interaction mode to the second interaction mode.

7. The method of claim 6, wherein augmenting the first interaction mode with the second interaction mode or transferring the interaction from the first interaction mode to the second interaction mode is facilitated by one or more unique identifiers configured to seamlessly transfer at least one of context, experience, history, action, interaction information, and authentication information between the first interaction mode and the second interaction mode.

8. The method of claim 1, further comprising:
configuring the notification to be responsive to a preference for at least one of a type of content, a presentation of the content, an interaction mode, and a time for receiving the notification.

9. The method of claim 8, further comprising:
predicting, by the processor, a time duration for which a customer is expected to be attentive to the notification; and
configuring the presentation of the content to optimize use of the time duration for which the customer is expected to be attentive.

10. The method of claim 1, further comprising:
customizing, by the processor, a content of the notification to be responsive to the predicted activity.

11. The method of claim 1, further comprising:
receiving, by the processor, location information corresponding to a current location of the device; and
determining, by the processor, a preference of an interaction mode for receiving the notification based on the location information, wherein determining the preference of the interaction mode comprises determining a preferred interaction channel from among the plurality of interaction channels and a device for receiving the notification.

12. The method of claim 11, wherein the device is one of a customer device or a public electronic device.

13. An apparatus, comprising:
at least one processor; and
a memory having stored therein machine executable instructions, that when executed by the at least one processor, cause the apparatus to:
detect that each of a plurality of interaction channels including a web-based channel, a native application-based channel, or a voice-based channel are concurrently active, indicating availability to receive notifications on an interaction channel;
store in the memory, information indicating the concurrently active plurality of interaction channels;
configure prediction models to extract features comprising a combination of n-grams, unigrams, bigrams, and trigrams from the stored information and interactions on one or more of the plurality of interaction channels to predict activity on one or more of the plurality of interaction channels;
create communication linkages across the one or more of the plurality of interaction channels probabilistically based on machine learning and statistical models driven by the activity and attributes of Web activity on the plurality of interaction channels, wherein the attributes of Web activity include unique identifiers operable to be matched with the one or more of the plurality of interaction channels, wherein the unique identifiers include Web cookies, and wherein the communication linkages are configured to transfer content between the plurality of interaction channels;
automatically determine, based on the predicted activity and the communication linkages across the one or more of the plurality of interaction channels, interaction information for the one or more of the plurality of interaction channels, where the interaction information indicates the current active interaction on an interaction channel, and the stored information indicates that each of the one or more of the plurality of interaction channels are concurrently active such that only one of the one or more of the plurality of interaction channels has the interactions at any point in time;
determining, based on the stored information and the interaction information, that a first interaction channel from among the one or more of the plurality of interaction channels is active but does not have the interactions customer's attention;
initiate a notification on a first interaction channel from among the one or more of the plurality of interaction channels, wherein the first interaction channel was determined as being active but not having the interactions, wherein initiating the notification on the first interaction channel further comprises:
matching the unique identifiers with the first interaction channel;
detect a second interaction channel from among the one or more of the plurality of interaction channels as being active and having the interactions based on the stored information and the interaction information; and
in response to the determination that the first interaction channel lacks the interactions and based on matching the one or more unique identifiers with the second interaction channel, automatically provision the notification to the second interaction channel that has the interactions.

14. The apparatus of claim 13, wherein the apparatus is further caused to perform any of:
configure the notification as a passive notification that provides useful information; and
configure the notification as an active notification that prompts an action.

15. The apparatus of claim 14, wherein the apparatus is further caused to:
configure the active notification to comprise a request for an interaction with a representative.

16. The apparatus of claim 15, wherein the interaction corresponds to a natural language based interaction between the device and the representative.

17. The apparatus of claim 15, wherein the apparatus is further caused to:
configure the request for the interaction to comprise a suggestion for conducting the interaction over a preferred interaction mode and at a preferred interaction time.

18. The apparatus of claim 17, wherein the apparatus is further caused to:
facilitate upon initiation of the interaction between the device and the representative over a first interaction mode, any of an augmenting of the first interaction mode with a second interaction mode and a transferring of the interaction from the first interaction mode to the second interaction mode.

19. The apparatus of claim 18, wherein the augmenting of the first interaction mode with the second interaction mode or transferring of the interaction from the first interaction mode to the second interaction mode is facilitated by one or more unique identifiers configured to seamlessly transfer at least one of context, experience, history, action, interaction information, and authentication information between the first interaction mode and the second interaction mode.

20. The apparatus of claim 13, wherein the apparatus is further caused to:
configure the notification to be responsive to a preference for at least one of a type of content, a presentation of the content, an interaction mode, and a time for receiving the notification.

21. The apparatus of claim 20, wherein the apparatus is further caused to:
predict a time duration for which a customer is expected to be attentive to the notification; and
configure the presentation of the content to optimize use of the time duration for which the customer is expected to be attentive.

22. The apparatus of claim 13, wherein the apparatus is further caused to:
customize a content of the notification to be responsive to the predicted activity.

23. The apparatus of claim 13, wherein the apparatus is further caused to:
receive location information corresponding to a current location; and
determine a preference of an interaction mode for receiving the notification based on the location information, wherein determining the preference of the interaction mode comprises determining a preferred interaction channel from among the plurality of interaction channels and a device for receiving the notification.

24. The apparatus of claim 23, wherein the device is one of a customer device or a public electronic device.

25. A non-transitory computer-readable medium storing a set of instructions that when executed cause a computer to perform a method comprising:
detecting that each of a plurality of interaction channels including a web-based channel, a native application-based channel, or a voice-based channel are concurrently active, indicating availability to receive notifications on an interaction channel;
storing in a memory, information indicating the concurrently active plurality of interaction channels;
configuring prediction models to extract features comprising a combination of n-grams, unigrams, bigrams, and trigrams from the stored information and interactions on one or more of the plurality of interaction channels to predict activity on one or more of the plurality of interaction channels;
generating creating communication linkages across the one or more of the plurality of interaction channels probabilistically based on machine learning and statistical models driven by the activity and attributes of Web activity on the plurality of interaction channels, wherein the attributes of Web activity include unique identifiers operable to be matched with the one or more of the plurality of interaction channels, wherein the unique identifiers include Web cookies, and wherein the communication linkages are configured to transfer content between the plurality of interaction channels;
automatically determining, based on the predicted activity and the communication linkages across the one or more of the plurality of interaction channels, interaction information for the one or more of the plurality of interaction channels, where the interaction information indicates the current active interaction on an interaction channel, and the stored information indicates that each of the one or more of the plurality of interaction channels are concurrently active such that only one of the one or more of the plurality of interaction channels has the interactions at any point in time;
determine, based on the stored information and the interaction information, that a first interaction channel from among the one or more of the plurality of interaction channels is active but does not have the interactions customer's attention;
initiating a notification on a first interaction channel from among the one or more of the plurality of interaction channels, wherein the first interaction channel was determined as being active but not having the interactions, wherein initiating a notification on the first interaction channel further comprises:
matching the unique identifiers with the customer on the first interaction channel;
detecting a second interaction channel from among the one or more of the plurality of interaction channels as being active and having the interactions based on the stored information and the interaction information; and
in response to determining that the first interaction channel lacks the interactions and based on matching the one or more unique identifiers with the second interaction channel, automatically provision the notification to the second interaction channel that has the interactions.

* * * * *